United States Patent [19]
Pershing

[11] 3,934,730
[45] *Jan. 27, 1976

[54] APPARATUS FOR TRANSPORTING ARTICLES ALONG CURVED HORIZONTAL PATH WHILE MAINTAINING ORIENTATION CONSTANT

[75] Inventor: John A. Pershing, Toledo, Ohio

[73] Assignee: Owens-Corning Fiberglas Corporation, Toledo, Ohio

[ * ] Notice: The portion of the term of this patent subsequent to Sept. 27, 1991, has been disclaimed.

[22] Filed: Dec. 2, 1971

[21] Appl. No.: 204,047

[52] U.S. Cl............. 214/1 BH; 198/243; 214/1 BC
[51] Int. Cl.².......................................... B65G 47/24
[58] Field of Search .. 214/1 BB, 1 BH, 1 BC, 1 BV, 214/1 BD, 1 B; 212/11; 198/243, 33 AB

[56] References Cited
UNITED STATES PATENTS

| | | | |
|---|---|---|---|
| 1,766,574 | 6/1930 | Westin............................. | 214/1 BD |
| 2,610,746 | 9/1952 | Steck............................... | 214/1 BC |
| 2,924,718 | 2/1960 | Packard......................... | 214/1 BD X |
| 3,168,184 | 2/1965 | Galvin........................... | 214/1 BH X |
| 3,218,069 | 11/1965 | Halberschmidt............. | 214/1 BH X |
| 3,437,096 | 4/1969 | Warren......................... | 214/1 BV X |

Primary Examiner—Robert J. Spar
Assistant Examiner—George F. Abraham
Attorney, Agent, or Firm—Carl G. Staelin; John W. Overman; Paul J. Rose

[57] ABSTRACT

In a molding process wherein a press delivers molded parts alternately to two or more stations, an apparatus is provided for moving a part from any one of the alternate press unloading stations to a common receiving station. The apparatus moves the part along a curvilinear path while maintaining the orientation of the part constant with respect to the receiving station. The apparatus includes a carriage which is supported on an overhead track, and which itself supports a rotatable holder. The apparatus further includes mechanical means capable of rotating the holder in response to the change in angular orientation of the carriage as it moves along the curved track, to effect the controlled orientation of the part as desired.

9 Claims, 4 Drawing Figures

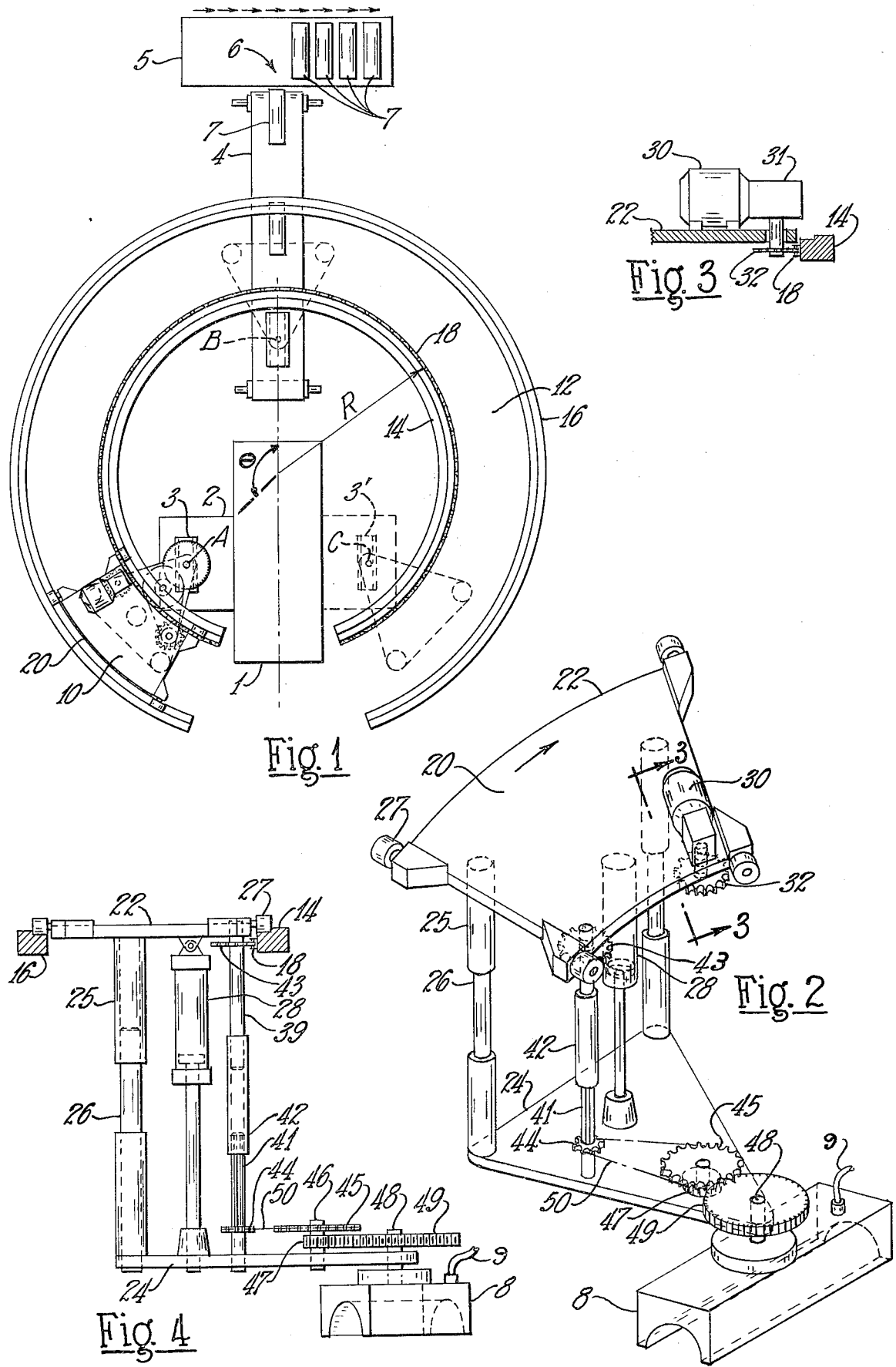

APPARATUS FOR TRANSPORTING ARTICLES ALONG CURVED HORIZONTAL PATH WHILE MAINTAINING ORIENTATION CONSTANT

This invention relates to a method and apparatus for handling articles such as workpieces or finished parts. More specifically the invention finds use in manufacturing processes where it is necessary to move the article from one station to another along a curved path and place it at the second station according to a predetermined orientation.

Notwithstanding the many modern day processes for manufacturing, packaging, distributing, etc., articles of manufacture in which the invention may have application, it has proven particularly useful in a representative process which will be referred to in the discussion of the invention which follows.

The process, known as the filter press process, is used for making molded thermal insulation products of hydrous calcium silicate. In this process a slurry is prepared consisting of cellular siliceous material, hydrated lime, and reinforcing fibers such as glass, mineral wool, or asbestos. This slurry is poured into a foraminous mold. The mold is closed in a press with sufficient pressure to force most of the water out of the slurry through the porous walls of the mold. The pressure imparted compacts the solids content in the slurry to develop sufficient shaperetaining cohesive strength in the resulting wet molded part to make the product handleable without support. The "green ware" is then placed in an autoclave under high pressure and temperature where it is cured and dried.

Calcium silicate products made by the filter press process are widely used as insulating materials in high temperature applications. Products can be molded in a variety of shapes, but the most common shapes are flat blocks and semi-cylindrical sections for insulating pipes. In the discussion of the invention and its association with the filter press process which follows, semi-cylindrical sections of calcium silicate green ware have been chosen to typify a workpiece which can be handled by the apparatus of the invention. Orientation of the semi-cylindrical workpiece will be discussed in relation to its longitudinal axis since this reference is most easily understood.

In a typical filter press process, the press is designed to unload parts alternately in one of two positions on opposite sides of the press. It is necessary to transfer the green ware from both unloading stations of the press to the next work station, which is usually the autoclave.

It has been found convenient to stack a large number of the uncured pieces on a flat car, which in turn is placed with other cars in the autoclave. In a commercially sized process the autoclaves are capable of handling a number of such cars at one time. It is therefore desirable to have a means for quickly and efficiently loading or stacking the green ware on the cars. An automatic loading facility can be more easily and inexpensively provided if the green ware is conveyed to the loading station according to a particular orientation. Otherwise, it is necessary to have a man arrange the workpieces before they go into the loaders, or to provide a complicated and expensive loader which can handle random parts.

It is therefore desirable to have a means for removing the workpieces from either of the unloading positions of the filter press, and transporting it to a station where it is deposited according to the same predetermined orientation regardless of which position it is transferred from. The green ware can then be either stacked directly on an autoclave car or conveyed to another position for further automatic handling as desired.

It is therefore a principal object of the invention to provide a method and apparatus for transferring articles, such as filter press green ware, from one or more press station along a curvilinear path to a common station where the workpiece is deposited according to a predetermined orientation.

Although it is within the scope of the invention to provide for any curved path which passes through a number of work stations, it has been found particularly convenient to have the transfer device travel a circular path. With this particular path it is possible to have the transferring device maintain a particular orientation constantly throughout the path.

It is therefore another object of the present invention to provide a method and apparatus for moving an article along a circular path while maintaining the orientation of the article constant with respect to a fixed reference lying in the plane of the circular path.

It is a further object to provide an apparatus capable of performing the above method which is both simple in construction and operation.

These and other objects are achieved in the present invention by an apparatus which includes a carriage which traverses a curvilinear path embodied in the form of a track. An elevatable and rotatable holder for the article is attached to the carriage. A device is provided for sensing the change in angular orientation of the carriage as it moves along the path. Also provided is a device responsive to the sensing device for rotating the article holder to control its orientation and therefore the orientation of the article. In one embodiment of the invention, discussed in detail below, the track is circular, and simple mechanical transmission components are combined to provide for constant corrective rotation of the holder to maintain the orientation of the article constant at all points along the circular path.

Further discussion and description of the invention follows with reference to the accompanying drawings forming a part of this specification, of which:

FIG. 1 is a plan view showing the apparatus of this invention in association with a typical filter press process arrangement;

FIG. 2 is a view in perspective of an apparatus embodying the present invention;

FIG. 3 is a side elevation view in section of the drive for the apparatus of FIG. 2 as taken along the line 3—3 in FIG. 2; and FIG. 4 is a side elevation view of the apparatus of FIG. 2.

Referring to FIG. 1, a typical filter press for making molded calcium silicate products is shown and indicated generally at 1. The filter press 1 includes a hydraulically operated mold ram head. Attached to the ram head is a male mold section. The filter press also includes a reciprocating table 2, which is provided with a female mold section 3, 3' on each end. In the operation of the filter press, parts are molded alternately on the female mold sections 3 and 3' with the press table indexing back and forth between cycles. When a molding cycle is complete, the press opens and the table 2 shifts to the opposite position whereupon the formed part can be removed from the female mold section as another part is being formed. In FIG. 1 the table is shown in the left-hand position A with the part on the left-hand mold 3 ready to be removed.

A receiving conveyor 4 is shown on an axis parallel to the centerline of the filter press 1. An autoclave car loading station 6 is shown at the end of the receiving conveyor. An autoclave car 5 can be indexed transversely to the conveyor 4 to facilitate the automatic stacking of the workpieces 7 thereon. This method of loading the cars is only representative; no attempt is made to show or describe any or all of the many devices for automatically stacking, packing or otherwise handling objects, with which the invention could be used.

A transfer device is shown generally at 10. The carriage 20 is designed to travel along the circular track 12. The carriage can travel from a position directly over the left-hand unloading position A of the press table 2 to position B above the receiving conveyor 4, and subsequently on to the position C over the right-hand unloading portion of the press table. Thus workpieces 7 can be removed from either unloading position A or C of the press 1 and delivered to the receiving station B according to the same orientation for easy loading onto the autoclave car 5.

The track 12 comprises an inside rail 14, an outside rail 16, and a length of roller chain 18 pulled tightly along the outer circumference of the inside rail 14. Although the track 12 is shown circular, it is intended to be representative of any curvilinear pathway, since as will be discussed later, the invention in its broadest sense has application to other curvilinear pathways besides circular ones. The circular arrangement of the track 12 is shown since it is particularly suited in the filter press process arrangement as shown, and in other processes where a larger number of stations are to be served.

FIG. 2 shows the transfer device 10 in more detail. The carriage assembly 20 consists of a top support plate 22 which is supported on the track 12 by rollers 27. The bottom support plate 24 is supported from the top plate 22 by an air cylinder 28. The female guides 25 extend down from the bottom of the top support plate 22 and mate with the guide rods 26 extending up from support plate 24 to maintain the alignment of the apparatus. The air cylinder 28 is capable of raising or lowering the bottom support plate 24 when removing the workpieces from the molds or depositing them on the receiving conveyor 4.

The drive for the carriage 20 is shown in FIG. 3. It consists of an air motor 30, a reducer 31 and a sprocket 32. The drive assembly is mounted on the top support plate 22 with the sprocket 32 engaging the chain 18 mounted on the inside rail 14. Although any of a number of conventional drive systems could be used, a hydraulic or pneumatic motor is particularly suitable, since its direction is easily reversed through a simple application of valves and controls.

Referring again to FIG. 2, a workpiece holder 8 is shown suspended from the bottom support plate 24 of the carriage by shaft 48. Since the green ware produced in the filter press process is somewhat fragile, the workpiece holder 8 in this embodiment is designed with suction means 9 to lift the workpiece 7 from the molds of the filter press. Of course in other applications, depending on the workpiece or article to be handled, other types of holders including hooks, clamps, brackets, belt slings, forks, magnets, and many others would be satisfactory. Although there may be applications where it is not necessary, it is preferred that the article be held fixed, so that there is little or no movement of the article with respect to the holder.

FIGS. 2 and 3 show the mechanism by which the workpiece holder 8 is rotated as the carriage 20 traverses along the track 12. The mechanism consists of sprocket 43, shaft 39, splined collar 42, spline 41, sprocket 44, chain 50, shaft 46, sprocket 45, gear 47, and gear 49. As the carriage is driven along the track sprocket 43 engages the chain 18 which extends parallel to the track 12. Sprocket 43 rotates the shaft 39, the spline collar 42, the spline 41 and the sprocket 44, which through chain 50 drives the larger sprocket 45. The small gear 47 which is on a common shaft with sprocket 45 is then rotated to turn the larger gear 49, which through shaft 48 turns the holder 8.

It can be seen from the arrangement of these drive elements that all sprockets rotate in the same direction as does the small gear 47. However the large gear 49 will rotate oppositely to the direction of rotation of the sprockets and the small gear and therefore rotate the workpiece holder in the opposite direction from the angular rotation of the carriage 20 as it moves around the track. As will be discussed below, by the proper selection of sprocket and gear ratios in this arrangement the rotation of the workpiece holder can be made equal to that of the carriage or in any proportion thereto.

As mentioned earlier, at the end of a cycle, the press 1 opens and the table 2 shifts to the opposite station which in FIG. 1 is shown as A. At this time the carriage 20 is in position over the unloading station. As it moves into position the press table 2 trips a limit switch or other control mechanism to actuate the air cylinder 28 and lower the bottom support plate and the workpiece holder 8 into contacting engagement with the workpiece 7. The suction means connected to the workpiece holder 8 is activated and the air cylinder is retracted to lift the workpiece off the mold on the press table.

Another limit switch or control mechanism is now tripped to actuate the drive motor 30 and the carriage begins its traverse to position B. At position B the air cylinder lowers the bottom support plate and the workpiece holder to deposit the workpiece 7 on the receiving conveyor 4. The suction is released and the air cylinder is then retracted and the carriage continues on its journey until it is at position C ready for the next part to come out of the filter press.

As the carriage traverses from position A to position B or any other position along the track 12, its orientation with respect to the centerline of the press 1 or the receiving conveyor 4 is changed by the angle $\theta$. Consequently if the workpiece holder were fixed with respect to the carriage 20, the orientation of the workpiece would also change by that same angle $\theta$.

However, in the present invention the apparatus described above is capable of compensating for the rotation of the carriage. As the carriage moves along the track 12, sprocket 43 is rotated thus indicating a change in the position of the carriage, and consequently because of the design of the system, indicating the change in angular orientation of the carriage. The rotation of the sprocket 43 is proportioned in amount and reversed in direction by the combination of sprockets 44 and 45 and gears 47 and 49 to rotate the workpiece holder 8 an amount equal to or in direct proportion to the angular change of the carriage. As a result of the action of the above mechanical transmission the orientation of the workpiece 7 is controlled at all times.

In the specific embodiment of the invention described above, and as shown on the drawings, the proper selection of transmission components will produce rotation of the workpiece holder equal but opposite to the angular change of the carriage as it moves around the track, thereby maintaining the orientation of the workpiece constant. For example it will become apparent to one skilled in the art that as the carriage moves around the track from position A to position B, its angular orientation changes by some clockwise angle, θ. Consequently, the mechanical drive system can be designed to revolve the workpiece holder 8 counterclockwise the same portion of a revolution as the angle θ bears to a full revolution. Accordingly, the drive ratio between the sprocket 43 and gear 49 can be determined as follows:

$$\frac{\text{Pitch of chain 18 (inches)} \times \text{no teeth in sprocket 43}}{2 \pi \times \text{radis } R \text{ (inches)}}$$

where R is measured to the centerline of the chain 18.

It is apparent that in its simplest form, the selection of components for the above-described embodiment is dependent on the radius R of the track. When the radius R has been selected the calculation of the drive mechanism follows readily to one skilled in the art.

Although the specific example of an apparatus embodying the present invention as shown includes a circular track, it is conceived that other curvilinear paths are within the scope of the invention. It will be apparent however, to one skilled in the art, that the more tortuous the path, the more complex will be the means for compensating for the angular change of the carriage. The circular track therefore offers a primary advantage in the simplicity of its geometry.

Furthermore, although the invention has been illustrated above including a particular mechanical system of various power transmission components to compensate for the rotation of the carriage, other mechanical systems might also be used. For example the chain 18 and the sprocket 43 could readily be replaced by a rack and pinion, or a friction wheel and surface, as the means for detecting the change in angular orientation of the carriage 20. Similarly, the mechanical drive reduction could consist of numerous combinations of well-known mechanical components including sprockets, gears, pulleys, sheaves, friction wheels, cams, etc.

Furthermore, in its broadest sense, the invention contemplates pneumatic, hydraulic, and electronic systems as well as the mechanical systems described. However, no further attempt is made here to specify all the various modifications or variations of the teaching of the invention which are within the scope of the invention as set forth in the claims which follow.

I claim:

1. Apparatus for horizontally transporting an article from any of a number of delivery stations lying along a horizontal curvilinear path to a receiving station while controlling the orientation of the article about a vertical axis with respect to the receiving station, comprising:

an elevated track which follows a horizontal curvilinear path passing over the delivery and receiving stations;
   a carriage supported from the track;
   a holder for fixably holding the article, the holder being rotatably supported from the carriage for rotation about a vertical axis;
   means mounted on the carriage for raising the holder to lift the article from a delivery station and for lowering the holder to deposit the article at the receiving station;
   means for moving the carriage along the curvilinear track while angularly changing its orientation about a vertical axis;
   and means responsive to the angular change in orientation of the carriage as it moves along the curvilinear track for rotating the holder to maintain the article at all times in fixed angular relationship with respect to the receiving station.

2. Apparatus as recited in claim 1, wherein the means for rotating the holder comprises: a stationary mechanical transmission element extending parallel to the track; and a rotatable transmission element mounted on the carriage and engaging the stationary transmission element.

3. Apparatus as recited in claim 2, wherein the means for repositioning the holding means is a combination of mechanical power transmission elements connected to the rotatable transmission element of the sensing means and to the holding means for rotating the holding means in response to the rotation of the sensing means.

4. Apparatus as recited in claim 3, wherein the stationary mechanical transmission element is a length of roller chain and wherein the rotatable transmission element is a sprocket.

5. Apparatus for horizontally transporting an aritcle from any of a number of delivery stations lying along a horizontal circular path to a receiving station while controlling the orientation of the article about a vertical axis with respect to the receiving station, comprising:

a circular horizontal track;
   a carriage supported by the track;
   holding means for holding the article, the holding means being rotatably mounted on the carriage for rotation about a vertical axis;
   means for moving the carriage along the track while angularly changing its orientation about a vertical axis;
   and means responsive to the angular change in orientation of the carriage as it moves along the track, comprising: a rotator mounted on the carriage and engaging the track for rotation about a vertical axis as the carriage is moved along the track; and mechanical transmission means connected to the rotator and the holding means for rotating the holding means in response to the rotation of the rotator, to maintain the article at all times in fixed angular relationship with respect to the receiving station.

6. Apparatus as recited in claim 5, including a length of roller chain extending parallel to the track; and wherein the rotator is a sprocket engaging the roller chain.

7. In a molding facility wherein a press delivers molded parts alternately to a number of different stations, an apparatus for horizontally transporting a part from any of the delivery stations along a horizontal curvilinear path common to all of the delivery stations to a receiving station while controlling the orientation of the article about a vertical axis with respect to the receiving station, comprising:

a carriage;

holding means for holding the part, the holding means being rotatably mounted on the carriage for rotation about a vertical axis;

means for moving the carriage along the curvilinear path while angularly changing its orientation about a vertical axis;

and means responsive to the angular change in orientation of the carriage as it moves along the curvilinear path for rotating the holding means to maintain the part at all times in fixed angular relationship with respect to the receiving station.

8. In a molding facility wherein a molding press delivers molded parts alternately to two or more different stations, an apparatus for horizontally transporting a molded part from one of the press delivery stations to a receiving station while controlling the orientation of the part about a vertical axis with respect to the receiving station, comprising:

a track following a horizontal curvilinear path passing above all of the press delivery stations;

a carriage mounted on said track;

holding means for holding the part, the holding means being rotatably mounted on said carriage for rotation about a vertical axis;

means for moving the carriage along the track while angularly changing its orientation about a vertical axis;

and means responsive to the angular change in orientation of the carriage as it moves along the curvilinear path for rotating said holding means to maintain fixed the orientation of the part relative to said receiving station at all points along the track.

9. An apparatus as recited in claim 8, wherein the track is circular.

* * * * *